United States Patent [19]

Jones

[11] Patent Number: 4,646,563
[45] Date of Patent: Mar. 3, 1987

[54] TRANSDUCER FOR USE IN DETECTING THE PRESSURE OF HIGH PRESSURE FUEL IN THE INJECTION SUPPLY PIPE OF A COMPRESSION IGNITION ENGINE

[76] Inventor: John Jones, 32 Longfields, Bicester, Oxon, England

[21] Appl. No.: 677,077

[22] Filed: Apr. 6, 1984

[30] Foreign Application Priority Data

Apr. 12, 1983 [GB] United Kingdom ................ 8309904

[51] Int. Cl.⁴ .......................... G01L 7/02; G01L 9/04
[52] U.S. Cl. .................................... 73/119 A; 73/730; 338/4
[58] Field of Search .................. 73/730, 119 A; 338/4

[56] References Cited

U.S. PATENT DOCUMENTS 4,391,147  7/1983  Kempl ................................... 73/730
4,404,854  9/1983  Kempl ................................... 73/730

FOREIGN PATENT DOCUMENTS 2007846 of 1979 United Kingdom .
2056076 of 1979 United Kingdom .
1564347 of 1980 United Kingdom .
2019581 of 1981 United Kingdom .

*Primary Examiner*—Donald O. Woodiel
*Attorney, Agent, or Firm*—Irvin A. Lavine

[57] ABSTRACT

A transducer for measuring circumferential expansion of a pipe comprises a pair of pivotally mounted clamping jaws, and a detector for the expansion of the pipe on each jaw. The detectors are resilient and are arranged in opposition across the pipe in a clamped position of the jaws. The detectors are in the form of resilient support strips having a central sensing or detecting portion for embracing a circumferential portion of the pipe, and limb portions to either side of the central sensing portion which define between them two extreme points of contact of the central portion with a pipe in the clamped position of the jaws. The limb portions extend along inclined surfaces of the body of the clamping jaws with respect to a plane containing the two points of contact such that the opposing limb portions of the support strips are disposed along diverging directions with respect to one another in the clamped position.

17 Claims, 4 Drawing Figures

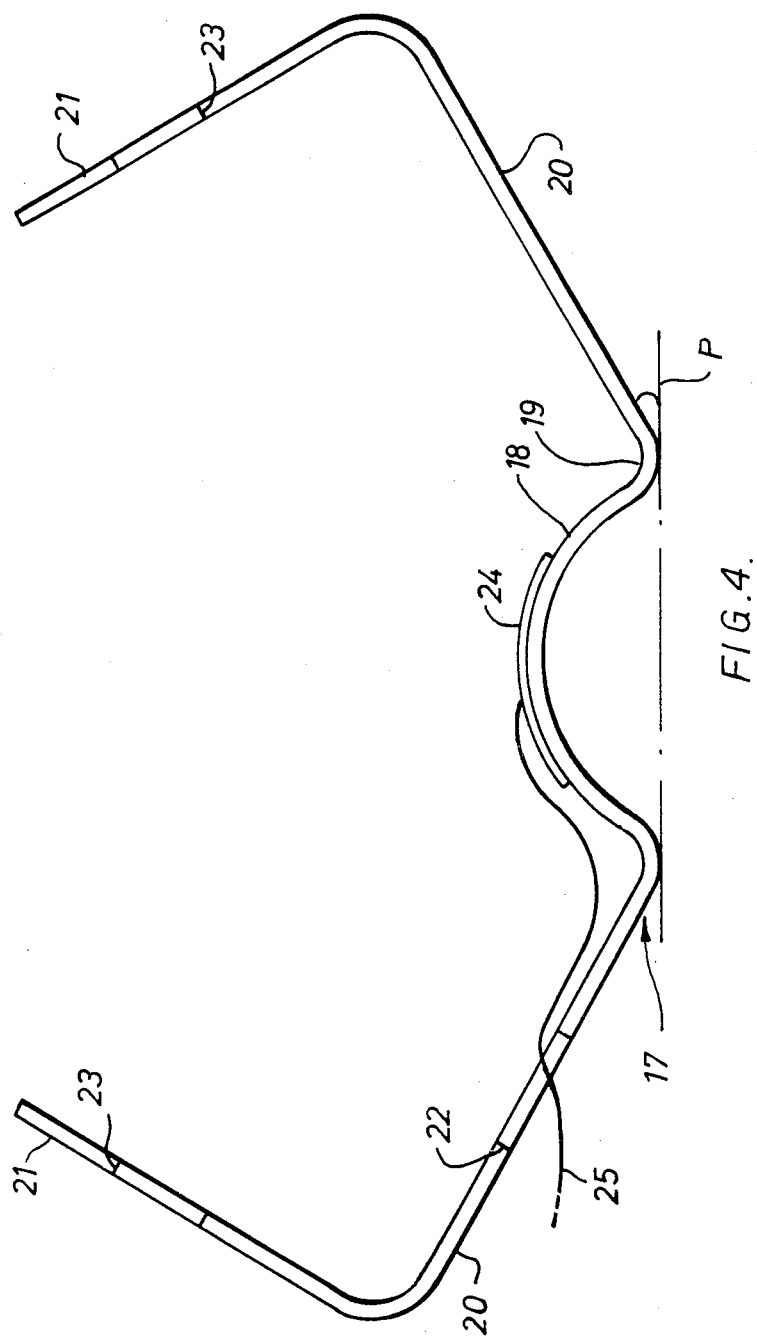

4,646,563

TRANSDUCER FOR USE IN DETECTING THE PRESSURE OF HIGH PRESSURE FUEL IN THE INJECTION SUPPLY PIPE OF A COMPRESSION IGNITION ENGINE

FIELD OF THE INVENTION

The present invention relates to a transducer for detecting the change in circumferential expansion of a fuel pipe during the passage of high pressure fuel. Such a transducer relies, but not exclusively, upon strain-gauges to detect the circumferential expansion of the fuel pipe and the transducer allows simple fitting and renewal of the strain-gauges.

BACKGROUND ART

The measurement of pipe circumferntial expansion in the fuel line of compression ignition engines is used to infer correct injection timing. Such data may also be analysed to show the duration and relative quantity of fuel injected for a given engine speed/load quantity of fuel injected for a given engine speed/load characteristic.

The measurement is currently made by either disconnecting the pipe and inserting a "T" piece with a pressure sensor or by clamping a sensor element in a resilient mounting, on the outside of the pipe. When fuel under pressure passes through the pipe it dilates and a variation appears in the output signal delivered by the sensor elements.

The sensor elements are normally in the form of resilient strips having a central concave section providing a concave face for embracing a circumferential portion of the pipe and with a strain gauge attached to the convex face of the concave section for measuring surface deformation of the pipe.

Two such resilient strips are then mounted respectively to a pair of articulated clamping jaws with the concave section supported on its associated jaw on a resilient backing insert.

The inbuilt resiliency both in respect of the support material and the backing insert improves sensitivity and protects the strain-gauge against pressure damage when the jaws are being clamped to the pipe. It also provides means for absorbing pipe vibrations which would otherwise cause the electrical pick-up from the strain-gauge to produce parasitic signals tending to swamp the useful measuring signals.

Such sensor elements are however still liable to premature failure and the effects of pipe vibraton on signal purity is still a detrimental factor.

The former problem manifests itself primarily due to use of the sensor elements on circular pipes having radii less than the radius of the concave embracing section so that when the clamping force is applied the concave section is caused to stretch excessively thereby overloading the strain-gauge well beyond its limitations.

While the latter problem has been mitigated to some degree as explained above, difficulties in encountering certain effects of pipe vibration for instance the movement of the clamping jaws along the pipe, still remain, these residing mainly in the design of the sensor elements and the manner in which the elements are mounted to the clamping jaws to make full use of the applied clamping force in holding the elements in position on the pipe surface.

SUMMARY OF THE INVENTION

It is an object of the invention to overcome the problems of the prior art by providing amongst other things a transducer of the above type designed to improve overall measurement accuracy, which includes characteristics acting to remove the detrimental effects of a measured signal purity caused by pipe vibration, and to extend its range of operation to pipes of varying size without reducing the life expectancy of the sensing devices mainly but not exclusively in the form of strain gauges.

According to one aspect of the invention there is provided a method of measuring circumferential expansion or transverse deformation of a fuel pipe of a compression ignition engine comprising providing a sensing element for pipe expansion in the form of a resilient strip having a resiliently deformable central concave sensing portion and a pair of limbs to either side of the concave portion defining a pair of spaced extreme contact points of the sensing elements, characterised by choosing a size of concave central portion in relation to the size of the pipe to be measured so that when a pair of said elements are applied to opposing surface portions of the pipe, said extreme points of contact touch the pipe before any other surface portion of said sensing portion, and applying an increasing clamping force to the elements until the remainder of the surface of said sensing portion is brought into contact with the surface of the pipe.

The advantage of this method lies in the redirection of those clamping forces, which would otherwise act to stretch the material of the concave portion, which bears the strain-gauge, rather to effect bending of the central portion into surface contact with the pipe so that thereby the strain-gauge is not overloaded.

This is because in the initial position the mid-point of the central position will be at maximum offset from the pipe surface.

The point of least resistance to the applied clamping force will therefore be over the offset part of the central concave portion, and accordingly there will be a preferential bending action of the concave portion under the clamping force until full surface contact is achieved without damage occurring to the strain-gauge, either through pressure contact damage against the pipe, or over-strain due to stretching as described.

Advantageously the thickness of the resilient strip is chosen so that both robustness and sensitivity are maximised. To achieve this result the thickness is chosen to be in the range 0.1 mm to 0.3 mm and preferably 0.15 mm. Anything smaller will not provide sufficient protection to the strain-gauge, while anything larger will reduce sensitivity to an unacceptable degree. Surprisingly the prior art appears not to have realised the criticality of these dimensions.

According to another aspect of the invention there is provided a transducer for measuring circumferential expansion in the fuel pipe of a compression ignition engine comprising a pair of pivotally mounted clamping jaws, a detector for pipe expansion of each jaw, the detectors being resilient to movement of the pipe and arranged in opposition across the pipe in a clamped position of the jaws, characterised in that the detectors are in the form of resilient support strips having a central sensing or detecting portion for embracing a circumferential portion of the pipe, and limb portions to either side of the central sensing portion defining therebetween two extreme points of contact of the central portion with the pipe in the clamped position of the jaws, said limbs extending along inclined surfaces in the body of the associated jaws with respect to a plane containing said two points of contact, such that the opposing limbs of the support strips are disposed along diverging directions with respect to one another in said clamped position.

The advantage of this arrangement lies in the improved distribution of the clamping forces of the closed jaws acting to urge each central sensing portion of the resilient support strips around and into firm contact with the pipe, under the bending action as provided by the procedure id the invention as hereinbefore described.

This is because components of the clamping force will be applied radially or more radially with respect to the pipe resulting in improved uniformity and strength of contact of the central portion with the pipe surface under operating conditions. Detection by the detector elements of all pipe movement is thus more positive and reliable, and resistance to movement of the transducer during pipe vibration is much increased.

In the case of pipe vibration and bending, when diametrically opposite detector elements are in compression and tension respectively, the generated signals will be of opposite polarity and will tend to cancel out. With the arrangement of the invention the possibility of any two such signals being of equal size or amplitude will be greatly increased, and thus mutual cancellation or electrical balancing, of all the unwanted signals will be considerably more complete and effective, and their effects on overall measurement accuracy thereby diminished.

Other features and advantages of the invention will become apparent from the description that follows of a preferred embodiment of the invention.

BRIEF DESCRIPTION OF THE DRAWINGS

The preferred embodiment will be described and illustrated with reference to the accompanying drawings wherein:

FIG. 4 is a detailed view of an insert sensor or detector element as mounted in the transducer of FIG. 1.

BEST MODES OF CARRYING OUT THE INVENTION

Figure 1:
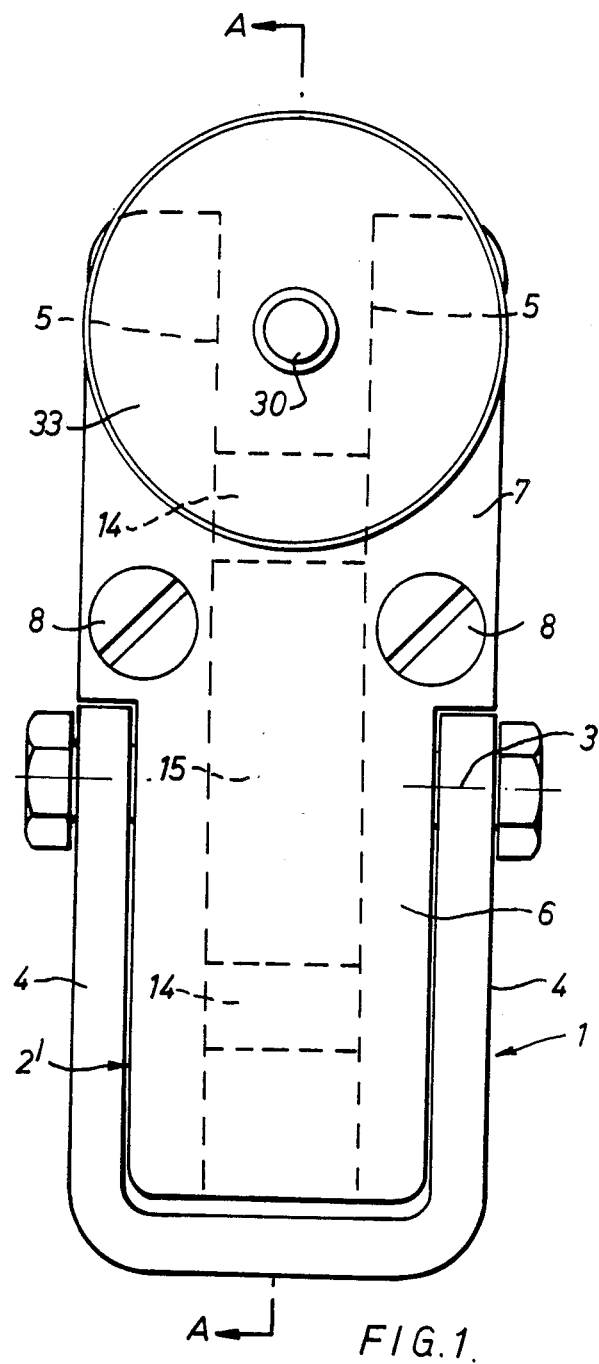
FIG. 1 is an end view of one form of transducer according to the invention.
Figure 2:
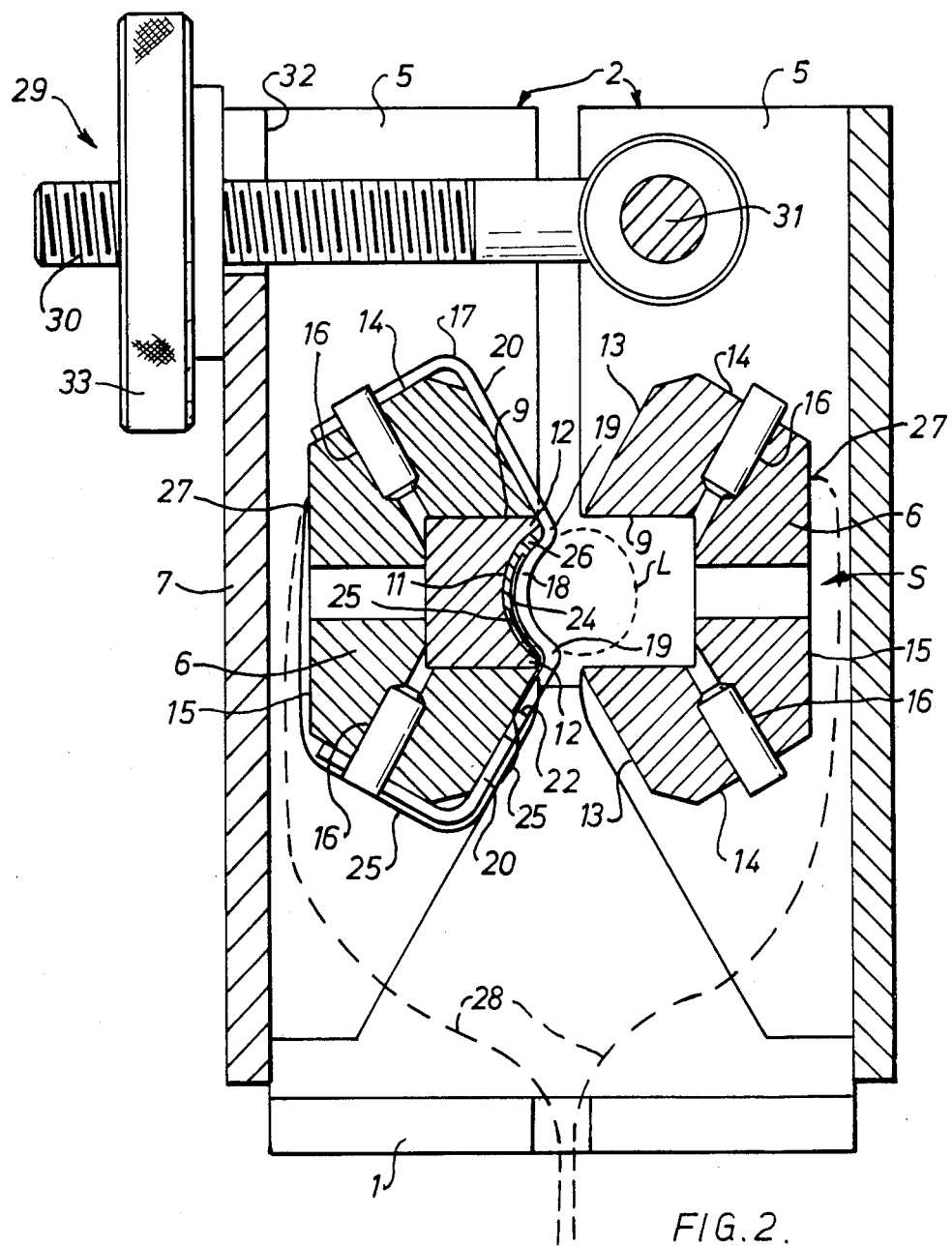
FIG. 2 is a cross-sectional view of the transducer of FIG. 1 along the line A—A.
Figure 3:
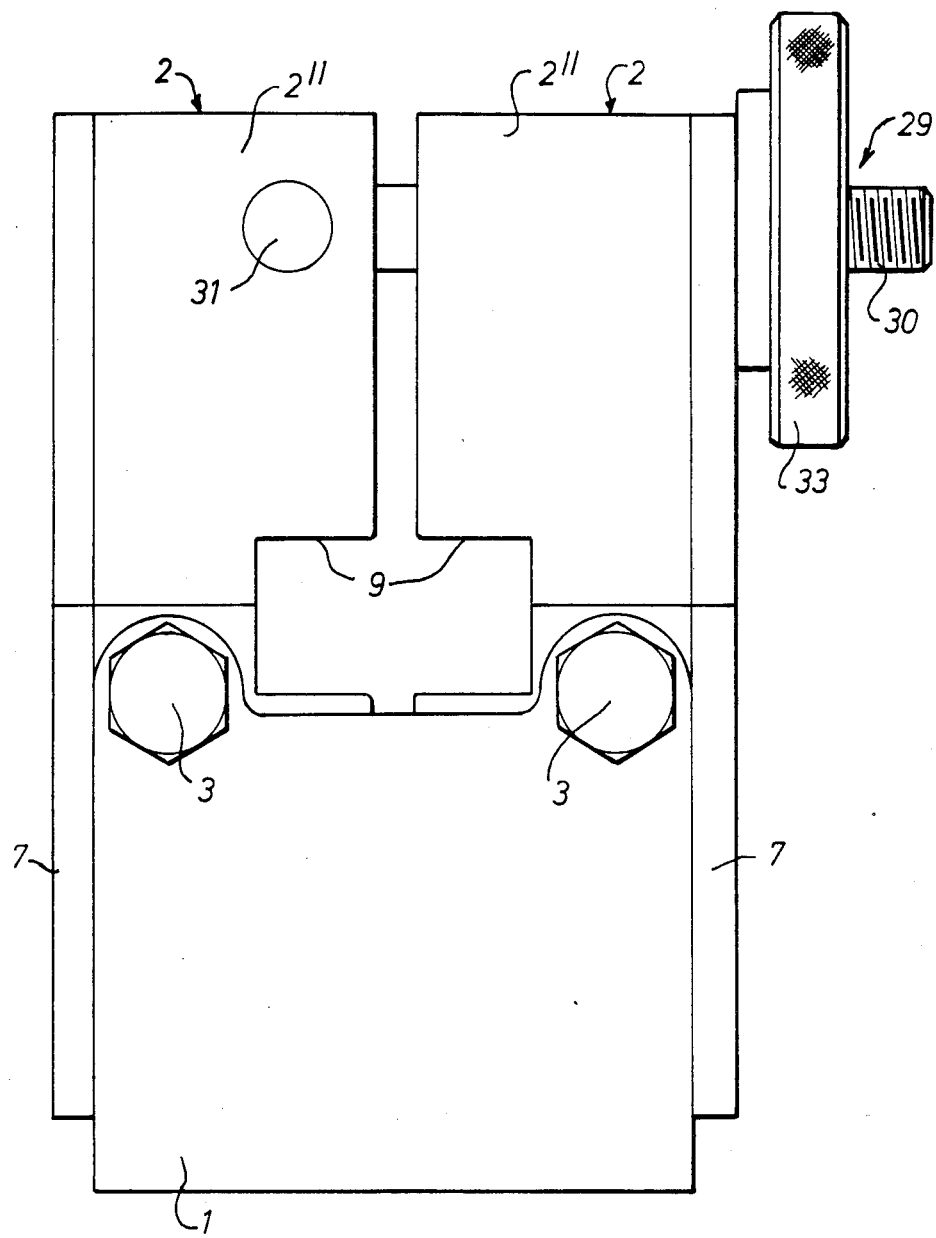
FIG. 3 is a side view of the transducer of FIG. 1.

The transducer shown in FIGS. 1, 2 and 3 has a U-shaped channel support 1 to which is hingedly mounted a pair of clamping jaws 2 on spaced independent pivotal axes 3 between the arms 4 of the U-shape channel support 1.

The pivotal axes 3 of the jaws 2 are substantially midway of their length so that the lower part 2' of each jaw 2 pivots within the U-shaped channel support 1 and an upper part 2" outside the U-shaped channel support 1.

Each of the jaws 2 is formed of two spaced elongate sections 5 joined together by an integral central portion 6, the pivotal axis 3 of each jaw 2 extending between the two elongate sections 5 and through the central portion 6. This arrangement is clearly shown in FIG. 1, the elongate sections 5 being illustrated in outline.

A cover plate 7 is mounted across the two elongate sections of each jaw on the outer face of the jaws, by means of screws 8 shown in FIG. 1.

The inner opposing faces of the jaws 2 have square-shaped cutouts 9, each cut-out 9 housing a resilient plug insert 10 (only one being shown in FIG. 2) having an open concave face 11 with radiused extremities 12.

The surface of each central portion 6 of the jaws 2 has a special configuration as shown. In particular it is provided with faces 13 leading from each cut-out 9 which are swept back with respect to the extremities 12 of the insert 10. Each portion 6 then has a face 14 at right angles to the first faces 13, these 90° faces being connected by a face 15 of the central portion 6 parallel to an associated cover plate 7 and leaving a space S therebetween. Holes 16 are bored in the faces 15 to communicate with the cut-outs 9.

Sensing or detecting elements are shaped to fit over the surfaces provided by the concave face 11 of the plug inserts 10, and the faces 13 and 14 of the central portion 6 of each jaw 2.

A typical sensing or detecting support element 17 for the transducer is shown in more detail in FIG. 4, and is seen to be of strip form having a concave central portion 18 conforming to the convave 11 of each plug insert 10, the concave central portion 18 having terminating radiused portions 19 extending either side to a pair of limbs 20 each being swept back from the central concave portion at an angle $\alpha$ to a line P tangentially joining the terminating radiused portions as shown.

The limbs 20 have terminating end pieces 21 each turned backwardly from the limbs 20. A hole 22 is drilled in one of the limbs 20, while each end piece 21 is provided with a drilling 23.

A strain gauge 24 is attached to the inner face of the concave central portion 18, a lead wire for measured signals passing through the drilling 22 in the limb 20 to be attached or connected to the strain gauge 24 as shown.

A sensing element 17 is shown in position in FIG. 2 on one jaw 2 of the transducer for purposes of illustration. It will be seen that the terminating pieces 21 of the sensing element 17 are secured to the central portion 6 by pins (not shown) passing through the holes 16 in the faces 14 of the central portion 6, these pins entering the material of the plug inserts 10 in the square-shaped cut-outs 9.

The material of the sensing or detecting elements 17 is resilient and preferably beryllium copper. Such a material has a high Youngs modulus, high yield point, good fatigue and hysterisis rating thus ensuring good sensitivity. Also its high thermal conductivity aids heat dissipation.

Additional resilience and flexibility however is provided by the plug inserts 10 being made of a yieldable material such as epoxy resin or a suitable plastics. Some plastics may be better suited than resins to ensure a return to original shape after prolonged use, thus preventing overstretching of the sensing elements.

Between the concave portion 18 of the sensing element 17 and the plug insert 10, is interposed a yieldable intermediate layer 26 in which the concave portion is bedded and which ensures freedom of the strain gauge 24 to measure surface strains. Suitable materials for the intermediate layer are either silicone rubber or nitrile rubber.

The connecting wire 25 from the strain gauge 24 is routed along the inner surface of the sensing element 17, to the outer side of the sensing element 17 through the drilling 22, to a terminal point 27 on each face 15 of the central portion 6.

The terminating points 27 provide connections for a lead-in cable 28 (shown in dotted form in FIG. 2) entering through the base of the U-shaped support 1, the wires of which pass internally of the transducer through the spaces S between the faces 15 of the central portion 6 and the adjacent removable cover plates 7.

The jaws 2 are clamped together by a latch 29 constituted by a threaded lever arm 30 pivoted to one of the jaws 2 on an axis 31. The other jaw 2 is provided with a slot 32 in which the lever arm 30 can pivotally enter so that the jaws can be pulled together by the action of a knurled nut 33 received on the threaded portion of the lever arm 30.

The transducer is shown in a clamped position in FIG. 2 with the sensing element 17 shown in position held against the surface of a pipe L illustrated in dotted outline. It will be fully appreciated that the other jaw will have a similarly mounted sensing element 17 so that the pipe L will be circumferentially embraced by both sensing elements in particular the central detecting concave portions 18 of the sensor elements.

Due to the disposition of the limbs 20 of the sensing elements 17 on the inclined faces 13 of the central portions 6, the components of the applied clamping force at the radiused extremities 19, which define two extreme points of contact of the central sensing portion 18 with the pipe L, will act in a radial direction with respect to the pipe L. These radial components in conjunction with the radial clamping force applied to the remainder of the concave portion 18 of the sensing element 17, will act to ensure that the concave central portions remain in firm contact with the surface of the pipe L during operating conditions which will include vibrational stress causing the pipe to bend. These vibrational forces will be additionally dampened by means of the resiliency or yieldability provided by the intermediate rubberised layer 26 and the plug inserts 10.

The size, in particular the radius, of the central portions 18 of the support elements 17, are chosen to be smaller than the radius of the pipe to which the transducer is to be clamped.

Thus for nominal pipe diameters of 6.35 mm, 6.00 mm, and 5.6 mm, the radii ranges respectively of the central portion 18 will be 3.00 to 3.10 mm, 2.85 to 2.95 mm and 2.15 to 2.25 mm.

This will ensure that when placed in the pre-clamped position, the extreme points of contact 19 of the sensing elements meet the pipe surface first, and with subsequent applied clamping force, the remainder of the surface of the central concave portions is brought into contact with the pipe surface.

The applied clamping force will thus be "encouraged" to bend the central concave portion into surface contact with the pipe rather than effect stretching thereof to this end, because the points of least resistance to these forces will be along the offset portions of concave portions 18 rather than at the extreme points of initial contact 19. Damage to the strain-gauge by pressure stress or overloading is thus avoided.

The thickness of the support strips 17 is chosen to maximise robustness, providing protection for the strain-gauge 24, and transducer sensitivity. The thickness required to achieve this is 0.15 mm but an acceptable range is 0.1 mm to 0.3 mm.

The transducer design as described is extremely versatile and provides accuracy of measurement not hitherto attainable with the prior art. It incorporates features which, as will have been apparent from the foregoing description, permit ready access to operational parts and facilitates easy removal of defective parts for repair or replacement.

What is claimed is:

1. A method of measuring circumferential expansion or transverse deformation of a fuel pipe of a compression ignition engine comprising providing a sensing element for pipe expansion in the form of a resilient strip having a resiliently deformable central concave sensing portion and a pair of limbs to either side of the concave portion defining a pair of spaced extreme contact points of the sensing element, characterised by choosing a size of concave central portion in relation to the size of the pipe to be measured so that when a pair of said sensing elements is applied to opposing surface portions of the pipe, said extreme points of contact touch the pipe before any other surface portion of said sensing portion, and applying an increasing clamping force to the elements until the remainder of the surface of the sensing portion is brought into contact with the surface of the pipe.

2. A method as claimed in claim 1 characterised in that the thickness of said strip is chosen to be in the range 0.1 mm to 0.3 mm.

3. A transducer for measuring circumferential expansion in the fuel pipe of a compression ignition engine comprising a pair of pivotally mounted clamping jaws, a detector for pipe expansion on each jaw, the detectors being resilient to movement of the pipe and arranged in opposition across the pipe in the clamped position of the jaws, characterised in that the detectors are in the form of resilient support strips having a central sensing or detecting portion for embracing a circumferential portion of the pipe, and limb portions to either side of the control sensing portion defining therebetween two extreme points of contact of the central portion with the pipe in the clamped position of the jaws, said limb portions extending along inclined surfaces in the body of said clamping jaws with respect to a plane containing said two points of contact, such that the opposing limb portions of the support strips are disposed along diverging directions with respect to one another in said clamped position.

4. A transducer as claimed in claim 3 characterised in that said inclined surfaces are each followed by a further surface formed in a respective jaw lying at an angle thereto, said limb portions terminating in turned end pieces of the support strips which are anchored in a respective said further surface.

5. A transducer as claimed in claim 4 characterised in that an intermediate layer of elastic material is interposed between said central sensing portion of the strip and said insert.

6. A transducer as claimed in claim 5 characterised in that a lead wire or wires for transmitting signals from said sensing portions representative of pipe circumferential expansion, are connected to the sensing portion of each strip on that side facing said intermediate layer, said lead wires passing along the inner surface of the associated support strip to exit on its outer surface through a said limb portion thereof.

7. A transducer as claimed in claim 3 characterised in that said central sensing portion of the support strips are concave and rest in a corresponding depression in a resilient insert in its associated jaw, said insert being located in a cut-out in its associated jaw, said inclined surfaces extending to either side of said cut-out.

8. A transducer as claimed in claim 7 characterised in that each clamping jaw is individually pivoted on said spaced parallel axes on a support member for the jaws.

9. A transducer as claimed in claim 8 characterised in that said support member is a U-shaped channel piece, said parallel axis extending between the arms of the said U-shaped channel piece.

10. A transducer as claimed in claim 9 characterised in that each clamping jaw has an upper and lower portion, the pivoting axis being substantially midway between said upper and lower portions, with the lower portion being within said channel piece.

11. A transducer as claimed in claim 10 characterised in that the opposing faces of the lower portions of each jaw are sloped back to allow the jaws to pivot.

12. A transducer as claimed in claim 11 characterised in the provision of a lever operated latch for clamping the jaws around a fuel line.

13. A transducer as claimed in claim 11 characterised in that said central sensing portion is a strain gauge.

14. A transducer as claimed in claim 9 characterised in removable outer plates on said jaws for housing terminals connecting said lead wires to a lead-in cable passing through the base of said U-shaped channel piece and between said outer plates and an adjacent said central portion or the jaws.

15. A transducer as claimed in claim 7 characterised in that said support strips are made of beryllium copper.

16. A transducer as claimed in claim 7 wherein said resilient insert is a resinous or plastics material.

17. A transducer as claimed in claim 16 wherein said intermediate layer is a rubberised material.

* * * * *